US006687622B2

United States Patent
Parker

(12) United States Patent
(10) Patent No.: US 6,687,622 B2
(45) Date of Patent: Feb. 3, 2004

(54) LEAK DETECTION APPARATUS FOR BLISTER PACKS

(75) Inventor: Andrew Ernest Parker, Newtownards (IE)

(73) Assignee: Sepha Limited, Newtownards (IE)

( * ) Notice: Subject to any disclaimer, the term of this patent is extended or adjusted under 35 U.S.C. 154(b) by 0 days.

(21) Appl. No.: 10/012,189

(22) Filed: Nov. 5, 2001

(65) Prior Publication Data
US 2003/0088371 A1 May 8, 2003

(51) Int. Cl.[7] .............. G01B 5/28; G01B 5/30; G06F 19/00
(52) U.S. Cl. .............. 702/36; 73/40; 73/40.7; 73/41; 73/49.2; 53/425; 417/9
(58) Field of Search .............. 702/36; 73/40.7, 73/40, 41, 49.2; 53/53, 425; 417/9

(56) References Cited

U.S. PATENT DOCUMENTS

| 3,837,215 A | | 9/1974 | Massage | |
|---|---|---|---|---|
| 4,661,045 A | * | 4/1987 | Winston et al. | 417/9 |
| 4,747,298 A | | 5/1988 | McDaniel | |
| 4,850,696 A | | 7/1989 | Yamato et al. | |
| 4,907,443 A | | 3/1990 | Pailler | |
| 5,082,366 A | | 1/1992 | Tyson, II et al. | |
| 5,105,654 A | | 4/1992 | Maruyama et al. | |
| 5,361,626 A | * | 11/1994 | Colligan et al. | 73/40.7 |
| 5,673,533 A | * | 10/1997 | Wang et al. | 53/53 |
| 6,351,984 B1 | * | 3/2002 | Srinivasan | 73/40.7 |

FOREIGN PATENT DOCUMENTS

EP    654 656 A1 * 10/1994 .......... G01M/3/32

* cited by examiner

Primary Examiner—John Barlow
Assistant Examiner—Adity Bhat
(74) Attorney, Agent, or Firm—Wolf, Greenfield & Sacks, P.C.

(57) ABSTRACT

Apparatus for detecting a leak in one or more pockets of one or more blister packs is described. The apparatus comprises means to support the or each pack, means to apply a reduced pressure around the or each pack so as to cause deflection of at least one side of the or each blister pocket, and a scanner means moveable or stationary in relation to the blister pockets, and a computing means. The scanner means is able to scan across at least one side of the or each blister pocket so as to detect the deflection of that side of the or each blister pocket at a reduced pressure, and the computing means compares scans at different pressures over the or each pocket.

The apparatus can detect a leak in any format of blister pocket regardless of the shape of the pocket or whether the contents are tablets or capsules. Preferably, the blister packs are supported on a nest or similar means.

The apparatus of the present invention can be of any suitable size, shape and design so as to be able to test one or a number of blister packs simultaneously.

17 Claims, 3 Drawing Sheets

LEAK DETECTION APPARATUS FOR BLISTER PACKS

The present invention relates to leak detection apparatus for blister packs, particularly but not exclusively pharmaceutical blister packs.

Currently, there are a number of methods used to detect leaks in the pockets of pharmaceutical blister packs. In one current method, a vacuum is applied across the blister pack being tested, and the rate of decompression when the vacuum is released gives an overall indication of the existence of a leak in one or more of the pockets of the blister pack. However, this method does not identify which pocket is faulty. In a second current method, individual apparatus is contacted with every pocket of a blister pack for individual testing. Whilst this will reveal individual pockets which are leaking, the overall testing procedure is time-consuming, difficult to validate, marks the pack, expensive, and limited in use.

Identification of which pocket or pockets are leaking in a blister pack is particularly desired in order to provide information on any faults or weaknesses in the manufacturing process, e.g. a fault which constantly leads to the same-positioned pocket being damaged.

According to one aspect of the present invention, there is provided apparatus for detecting a leak in one or more pockets of one or more blister packs, the apparatus comprising means to support the or each pack, means to apply a reduced pressure around the or each pack so as to cause deflection of at least one side of the or each blister pocket, a scanner means moveable or stationary in relation to the blister pockets, and a computing means, wherein the scanner means is able to scan across at least one side of the or each blister pocket so as to detect the deflection of that side of the or each blister pocket at a reduced pressure, and the computing means is able to compare scans at different pressures over the or each pocket.

Means for supporting one or more blister packs and means for creating and releasing a reduced pressure, such as a vacuum, therearound are well known in the art.

The scanner means may be any suitable means able to provide a height or distance scan. Suitable scanner means include lasers, cameras, etc. These scanner means avoid any pocket contact.

The apparatus preferably detects the deflection of the pocket(s) at more than one pressure, e.g. at atmospheric pressure, at a vacuum or near-vacuum, and possibly one or more intermediate pressures.

The scanner means could be stationary or have movement to range across the pockets. In one embodiment, the scanner means is a stationary camera able to scan all blister pockets, whether stationary or mobile themselves, thereunder. There could be more than one scanner, e.g. two scanner means, one on each side of a blister pocket.

The apparatus of the present invention can detect a leak in any format of blister pocket regardless of the shape of the pocket or whether the contents are tablets or capsules. Preferably, the blister packs are supported on a nest or similar means housed in or by the support means. Different nests could be provided for different sized and/or shaped blister packs.

The apparatus of the present invention can be of any suitable size, shape and design so as to be able to test one or a number of blister packs simultaneously.

The apparatus may include means to mark the or each pocket and/or pack having a detected leak.

The apparatus of the present invention is capable of detecting holes of low sizes typically down to five microns, or lower with time to allow pressure changes to be affected in a pocket.

According to a second aspect of the present invention, there is provided a method of detecting a leak in one or more blister pockets of one or more blister packs, comprising the steps of:
(a) locating the or each blister pack on a support means;
(b) applying a reduced pressure around the or each blister pack;
(c) guiding one or more scanner means across at least one side of the or each blister pocket;
(d) changing the pressure; and
(e) detecting the deflection of the or each side of the or each blister pocket so as to determine the presence of a leak in the or each pocket.

According to a third aspect of the present invention, there is provided a monitor screen presentation diagrammatically representing one or more blister packs having one or more blister pockets undergoing a leak detection test, wherein the or each sealed blister pocket is represented by a first indicia, such as a first colour, and the or each leaking pocket is represented in a second indicia, such as a second colour.

One such indicia is the word "fail". With colour, preferably the first colour is green and the second colour is red, although any two suitable colours can be selected. Preferably the or each pack is undergoing a leak detection test using the apparatus and/or method hereinbefore described.

The screen presentation provides clear graphic display of test results for a non-skilled operator. Results can also be recorded or transmitted as desired or necessary.

Table 1 compares apparatus of the present invention identified as "BlisterScan" with other prior art test methods.

Embodiments of the present invention will now be described by way of example only and with reference to the accompanying diagrammatic drawings in which.

Figure 1:
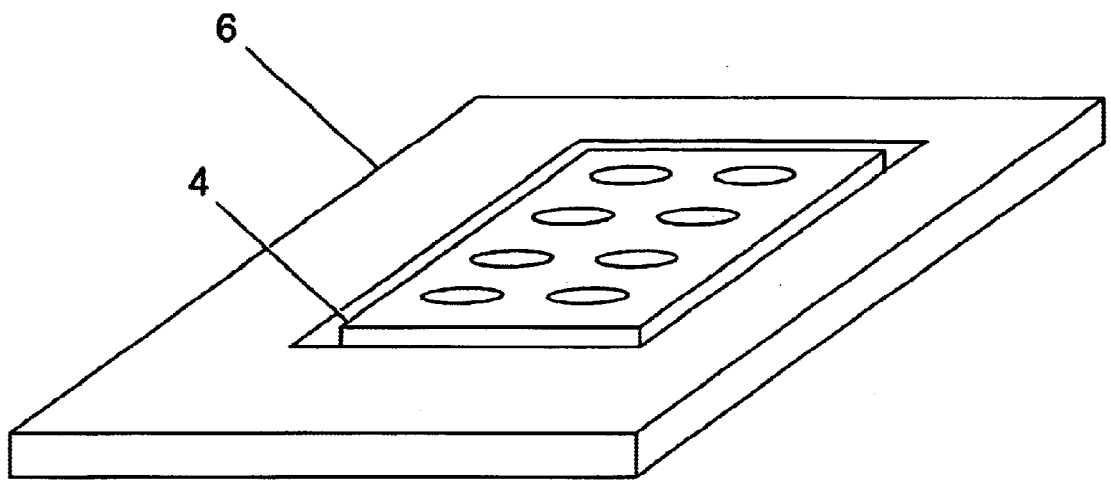
FIG. 1 is a perspective view of a means to support a blister pack.

Referring to the drawings, FIG. 1 shows a blister pack 2 located in a complementary nest 4, which template 4 includes a number of arranged apertures or channels etc. into which the blister wells are locatable in a depending manner from the generally flat side of the blister pack 2. The nest 4 is locatable in a larger support housing 6. The housing 6 can accommodate any number of different nests 4 for use with different blister packs requiring testing. The nests 4 could simply rest in the housing 6, thereby being easily substitutable.

Figure 2:
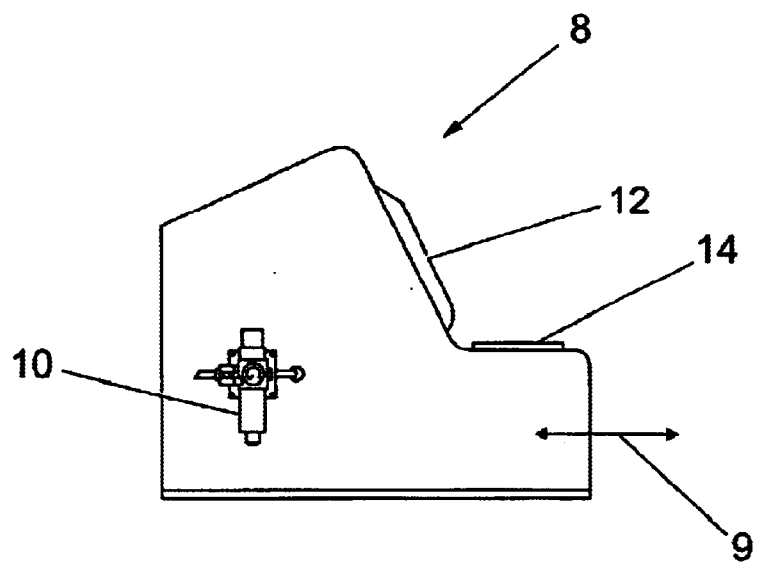
FIG. 2 is a schematic side view of apparatus according to one aspect of the present invention.

FIG. 2 is a schematic view of apparatus 8 according to the present invention, having a housing receiving part 9 adapted to allow the opening and shutting of a drawer such as housing 6 shown in FIG. 1. The housing 6 is moveable between an open position at which the blister packs and/or nests are changeable, and a closed position wherein the blister pack 2 is suitably located within the overall apparatus 8 for a vacuum to be applied therearound.

The apparatus 8 also includes suitable air inlet and outlet 10, and a monitor screen 12 and computer keyboard 14.

Figure 3:
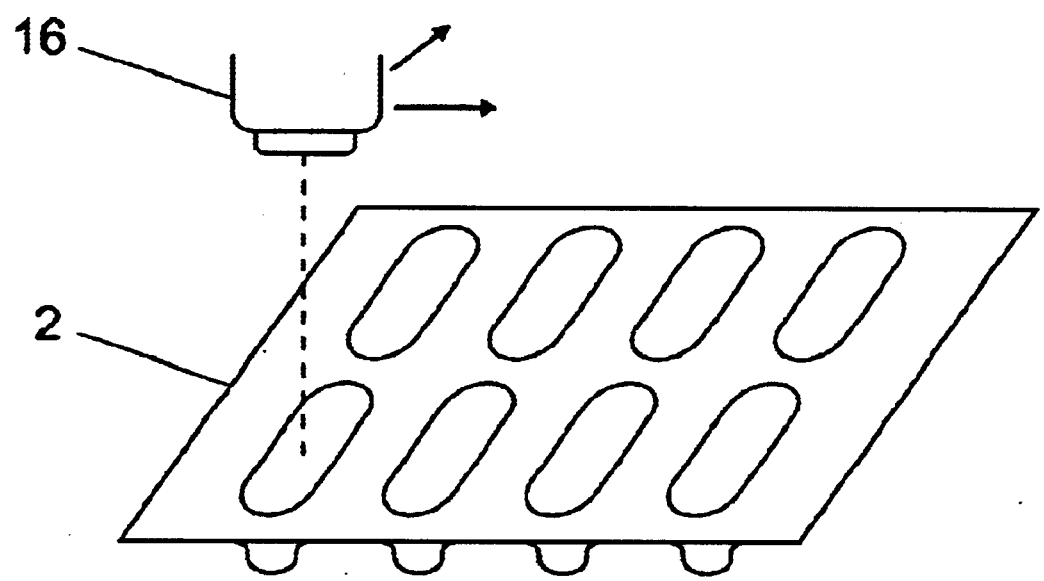
FIG. 3 is a perspective view of a blister pack and scanner head moveable thereacross.

FIG. 3 shows the blister pack 2 (without support, housing, etc.) across the generally flat side of the blister pack 2. The scanner head 16 is moveable in two dimensions. Thus, the scanner head 16 is able to pass across a number of blisters in one scan without the need for any movement of the blister pack 2.

Figure 4A:
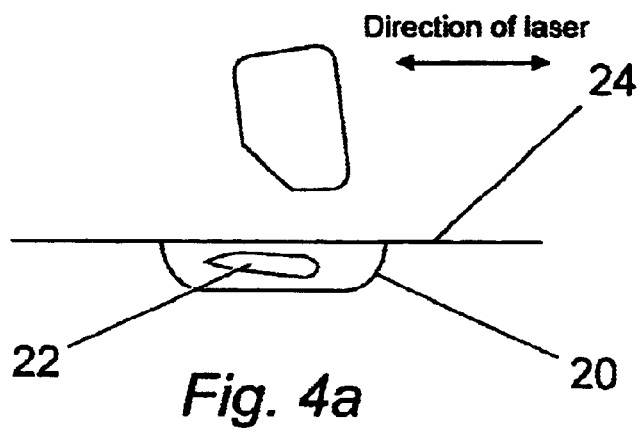
FIGS. 4a to 4d are cross-sectional side views of a blister at different pressure levels.

FIG. 4a shows a cross-sectional view of one blister 20 in the blister pack 2, with a tablet 22 therein. A nest (not shown) supports the blister 20.

In use, once the blister pack 2 has been located in the nest 4 and the drawer housing 6 properly located in the apparatus 8, a first blow of gas such as air across the flat side 24 of the blister pack 2 flattens any irregularities in the flat side 24. Then, a first scan is carried out by the scanner means 16 across each blister 20. This first scan provides a 'base' reference of which to compare future measurements. The scanner means 16 may also read a coding or other identifiable mark on the blister pack 2 to confirm/code the blister pack 2 being scanned for reference purposes.

The scanning measurements can be inputted directly into a suitable computing device able to store measurements made, and provide computing of future scans with reference thereto. The scanner could be laser, or camera working on for example structured light.

Figure 4B:
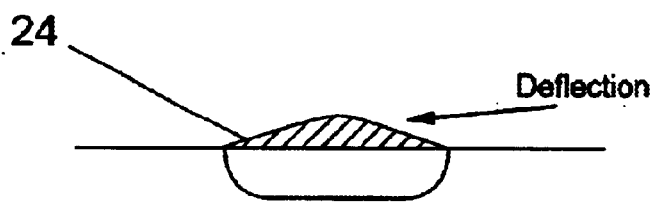

After the first scan, a reduced pressure is applied within the apparatus 8. The reduced pressure can be wholly or substantially a vacuum. The reduction in pressure should force at least the flat side 24 of each blister pocket 20 to deflect outwardly in view of the normal pressure within the blister pocket 20. This is shown in FIG. 4b. Non-deflection of the flat side 24 of the blister pocket 20 is one indicator of a gross leak in the pocket 20. After a suitable period, e.g. number of seconds, to allow time for full deflection under pressure, a second scan is taken by the scanner means 16. This second scan can be computated by the computer means, and the height of deflection of each blister pocket 20 compared with the measurements made by the first scan. Any abnormal height would be an indicator of a leak.

Figure 4C:
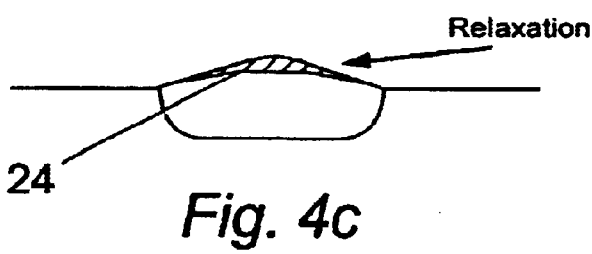
Figure 4D:
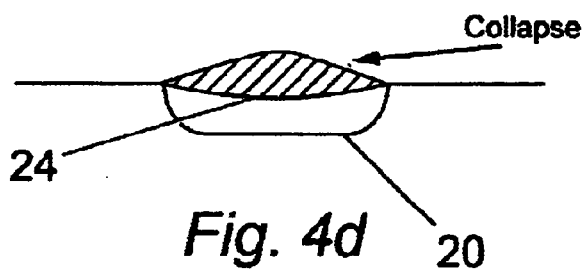

Thereafter, a partial increase in pressure/partial decrease in vacuum, is applied within the apparatus 8 and a third scan taken of all blister pockets 20 once time has allowed settling of the new pressure. This should reduce the deflection in the flat side 24 of each blister pocket as shown in FIG. 4c, and another scan measurement would confirm this. However, any pockets 20 having a minor leak may be revealed in this way by inward deflection of the flat blister pocket side due to the imbalance of increased pressure in the apparatus 8, but still reduced pressure within the pocket 20 (following the initial vacuum step).

Thereafter, pressure in the apparatus 8 is returned to the atmosphere, such that the drawer 6 can be opened and the blister pack 2 removed.

Figure 5:
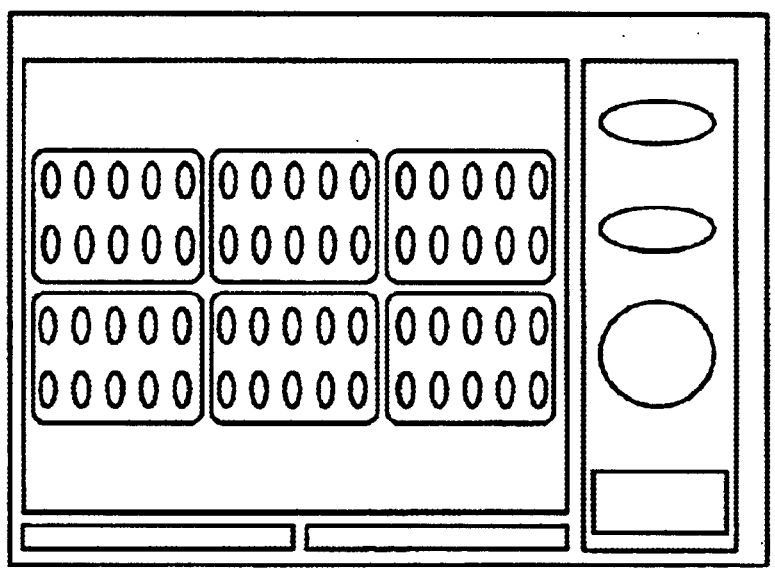
FIG. 5 is a view of a monitor screen according to another aspect of the present invention.

On the computer screen 12 on the apparatus 8 can be projected an image of the blister pack 2 such as that shown in FIG. 5, wherein there can be graphically illustrated by means of ticks, crosses or colour (such as green and red), those blister packs which conform to the required deflection expected where no problem exists, and those having a different indicator where a leak was detected.

The process of the present invention allows simultaneous testing of any number of blister pockets at one time, and immediate subsequent result information for analysis.

What is claimed is:

1. Apparatus for detecting a leak in one or more pockets of one or more blister packs, the apparatus comprising means to support the or each pack, means to apply a reduced pressure around the or each pack so as to cause deflection of at least one side of the or each blister pocket, a scanner means moveable or stationary in relation to the blister pockets, and a computing means, wherein the scanner means is able to scan across at least one side of the or each blister pocket so as to detect the deflection of that side of the or each blister pocket at a reduced pressure, and the computing means is able to compare scans at different pressures over the or each pocket.

2. Apparatus as claimed in claim 1 wherein the means to support the or each pack includes a nest.

3. Apparatus as claimed in claim 1 wherein the scanner means is a laser.

4. Apparatus as claimed in claim 1 wherein the scanner means is a camera.

5. Apparatus as claimed in claim 4 wherein the camera scans using structured light.

6. Apparatus as claimed in claim 1 wherein the scanner means detects the deflection of the or each pocket at more than one pressure.

7. Apparatus as claimed in claim 1 wherein the scanner means is stationary.

8. Apparatus as claimed in claim 1 wherein the scanner means is moveable across the pockets of the or each blister pack.

9. Apparatus as claimed in claim 1 any one of the preceding claims which includes two or more scanner means.

10. Apparatus as claimed in claim 1 adapted to detect holes in blister pockets down to 5 microns.

11. Apparatus as claimed in claim 1 having a housing for housing the or each blister pack at reduced pressure, and means moveable between an open and closed position for moving the means to support the or each pack.

12. Apparatus as claimed in claim 1 including means to mark the or each pocket or pack having a detected leak.

13. An apparatus as in claim 1 further comprising a monitor screen presentation diagrammatically representing one or more blister packs having one or more blister pockets undergoing a leak detection test, wherein the or each sealed blister pocket is represented by a first indicia, such as a first colour, and the or each leaking pocket is represented in a second indicia, such as a second colour and/or the word "fail".

14. An apparatus as in claim 13 wherein the first colour is green and the second colour is red.

15. A method of detecting a leak in one or more blister pockets of one or more blister packs, comprising the steps of:
    (a) locating the or each blister pack on a support means;
    (b) applying a reduced pressure around the or each blister pack;
    (c) guiding one or more scanner means across at least one side of the or each blister pocket;
    (d) changing the pressure; and
    (e) detecting the deflection of the or each side of the or each blister pocket so as to determine the presence of a leak in the or each pocket.

16. A method as claimed in claim 15 further comprising the step of changing the pressure around the or each blister pack a second time, and detecting the deflection of the or each side of the or each blister pocket a second time.

17. A method as in claim 15 wherein the or each blister pocket contains a tablet or capsule.

* * * * *